E. M. SHIRLEY.
Toy.

No. 208,543.     Patented Oct. 1, 1878.

WITNESSES
Wilmer Bradford
James H. Lange

Edward M. Shirley
INVENTOR
per Edson Bros.
Attorneys.

UNITED STATES PATENT OFFICE.

EDWARD M. SHIRLEY, OF WASHINGTON, DISTRICT OF COLUMBIA.

IMPROVEMENT IN TOYS.

Specification forming part of Letters Patent No. 208,543, dated October 1, 1878; application filed September 7, 1878.

*To all whom it may concern:*

Be it known that I, EDWARD M. SHIRLEY, of Washington, District of Columbia, have invented certain new and useful Improvements in Toys; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
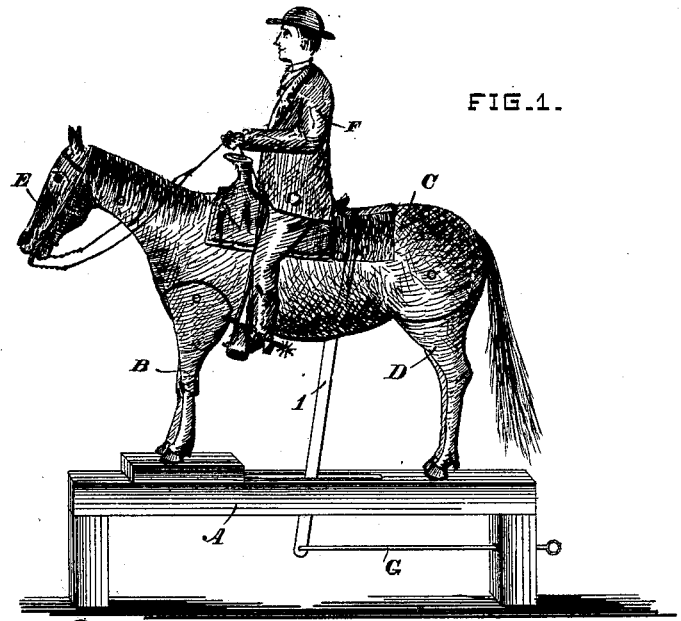
Figure 2:
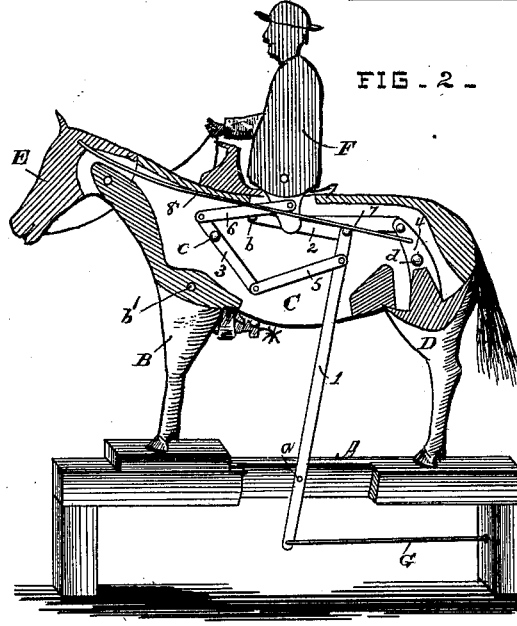
Figure 3:
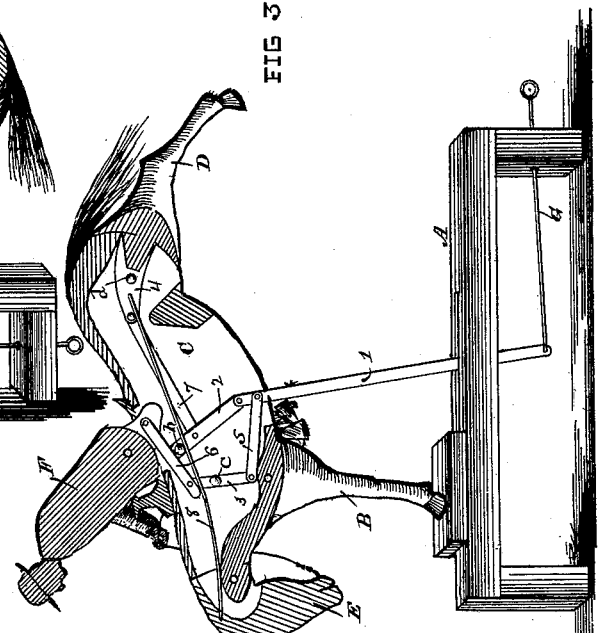

Figure 1 is a side elevation. Fig. 2 is a longitudinal vertical section, showing the body of the animal at rest and the position of the operative mechanism; and Fig. 3 is a similar view, showing the position of the operative mechanism when the animal is reared.

Corresponding parts in the several figures are indicated by similar letters of reference.

This invention relates to improvements in toys; and it consists of mechanism for moving the body, head, and hind legs of the animal and the body of its rider, as hereinafter more fully described and claimed.

In the annexed drawing, 1, 2, 3, and 4 are levers, pivoted at $a$, $b$, $c$, and $d$. 5, 6, 7, and 8 are connecting rods or bars. All the operative mechanism, except a portion of lever 1, is inclosed within the body of the animal. The lever 1 is pivoted to a suitable frame, A, upon which the fore legs B of the animal are rigidly mounted. To the upper end of lever 1 is secured the lever 2, which is pivoted to the body C at $b$. One end of rod 8 has a bearing in the head E, above its pivotal point, while the other end is secured to the lever 4, as clearly shown in the drawing. The lower end of the lever 4 is secured to the legs D, which move in the arc of a circle as the upper end of lever 4 is drawn forward by bar 7, which is pivoted to lever 2.

The rider F, from its pivotal point upward, can be thrown forward by means of the levers 1 and 3, pivoted at $a$ and $c$ and to the rods 5 and 6.

The body C of the animal is fulcrumed at $b'$ to the fore legs B.

To the lower end of the lever 1 may be secured a suitable rod, G, to operate the mechanism.

The legs of the rider are pivoted to his body, which is firmly secured to the body of the animal.

Operation: Throwing the upper end of lever 1 forward brings lever 2, which is pivoted to the body C at $b$, downward, and rears the animal upon its fore legs, throwing its head down and legs up, and bringing the rider F forward, as will be clearly understood by reference to Figs. 2 and 3 of the drawings.

Having thus described my invention, what I claim, and desire to secure by Letters Patent, is—

1. The combination, with the body C, pivoted to the legs B, of the levers 1 and 3, rods or bars 5 and 6, and rider F, substantially as shown and described.

2. The combination, with the body C, pivoted to the legs B, of the rod 7, levers 1, 2, and 4, and legs D, substantially as and for the purpose set forth.

3. The combination, with the body C, pivoted to the legs B, of the levers 1, 2, and 4, rods 7 and 8, and pivoted head E, substantially as and for the purpose set forth.

In testimony that I claim the foregoing as my own I hereunto affix my signature in presence of two witnesses.

EDWARD M. SHIRLEY.

Witnesses:
  G. W. LANGE,
  JAMES H. LANGE.